Dec. 1, 1970 A. WINSEL 3,544,279
APPARATUS FOR THE PRODUCTION OF GAS FOR GALVANIC FUEL CELLS
Filed Oct. 9, 1967 3 Sheets-Sheet 1

INVENTOR
August Winsel
BY Stephens, Huettig and O'Connell
ATTORNEYS

Dec. 1, 1970          A. WINSEL          3,544,279

APPARATUS FOR THE PRODUCTION OF GAS FOR GALVANIC FUEL CELLS

Filed Oct. 9, 1967          3 Sheets-Sheet 3

INVENTOR

*August Winsel*

BY *Stephens, Huettig and O'Connell*
ATTORNEYS

United States Patent Office 3,544,279
Patented Dec. 1, 1970

3,544,279
APPARATUS FOR THE PRODUCTION OF GAS
FOR GALVANIC FUEL CELLS
August Winsel, Kelkheim, Taunus, Germany, assignor to
Varta Aktiengesellschaft, Frankfurt am Main, Germany
Filed Oct. 9, 1967, Ser. No. 673,564
Claims priority, application Germany, Oct. 8, 1966,
V 32,086
Int. Cl. B01j 9/04, 7/02
U.S. Cl. 23—288                                    2 Claims

ABSTRACT OF THE DISCLOSURE

A porous gas generating device and process in which gas and waste material are produced by contacting a liquid raw material with a catalyst is provided with various means for providing a pressure differential between the source of raw material and the place of egress for the waste material, and including a waste disposal overflow pipeline; a valved gas line to allow some of the gas produced to be used to pressurize the supply of raw material; and a valved waste material disposal line having a pneumatic valve activated by the pressure of a portion of the gas produced.

BACKGROUND OF THE INVENTION

The device and process of the present invention relate to the art of producing such gases as may be used in the operation of galvanic fuel cells. Such gases are commonly prepared by contacting a suitable liquid raw material with an appropriate catalyst so as to generate the desired fuel gas. Thus, hydrogen gas can be obtained in this way by the catalytic decomposition of hydrazine or potassium borohydride by contacting such raw material with catalysts such as Raney nickel and the noble metals, notably platinum and palladium. Oxygen gas for use in the oxygen electrode, or cathode, of such fuel cells may be similarly produced by contacting hydrogen peroxide, usually in the form of an aqueous solution, with a suitable catalyst, which may also be one of the noble metals. In producing such gases in this manner the catalyst may be immersed in the liquid raw material to be decomposed or the liquid raw material may be caused to flow through the catalyst in the form of a bed or other means of providing a high catalyst surface area in order to provide as efficient contact of the raw material with the catalyst as possible. The raw material decomposition process can also be accomplished by utilizing a Kipp generation type gas generating device wherein contact between the catalyst and the liquid raw material is restrained. (Van Nostrand's International Encyclopedia of Chemical Science, 1964, pp. 653–654.)

The decomposition of appropriate liquid raw materials into the desired fuel gases can also be accomplished in gas diffusion electrodes so as to allow the thus produced fuel gas to be directly used in such electrodes in the intended electrochemical reaction. During the production of hydrogen gas in the electrode in this manner, however, electric potentials or voltages are likely to be generated by other materials present in the raw material solution or in the waste material by-product that may also be formed, which potentials will be more negative than the reversible hydrogen potential in the same environment. Under such conditions a cathodic separation of hydrogen from the hydrogen electrode will take place and lead to the formation of bubbles of hydrogen gas outside the electrode, which bubbles will of course rise in the electrolyte surrounding the hydrogen electrode and not take part in the desired electro-chemical reaction in the fuel cell. One way of preventing this separation or loss of hydrogen from the hydrogen electrode is presented in U.S. Pat. 3,201,282. According to the teaching of that patent the hydrogen electrode is provided with an outer or shell layer having a fine pored construction and made of a material having a high hydrogen overvoltage. The technical particulars relating to this so-called "valve electrode" were also described, among others, by E. Justi and A. Winsel in "Kalte Verbrennung-Fuel Cells," Steiner-Verlag, Wiesbaden, Germany, 1962.

German patent application S103,218 IVa/12g, which corresponds to U.S. patent application S.N. 630,128, filed Apr. 11, 1967 in the name of August Winsel described a process and apparatus in which chemical and electrochemical reactions were conducted in the pores of a porous structure utilizing, as reactants, separately introduced gaseous or liquid reactants having different wetting characteristics relative to the porous structure. The interior of the porous structure in which the reactions are conducted is constructed with a porous network having a spectrum of fine pores of 0.1 to 5 microns e.g. and a spectrum of large pores of varying sizes, of the order of 5 to 200 microns for example in cross sectional area. The cover or shell layers of the porous structure contain a porous network of fine pores of the order of 0.1 to 5 microns for example in cross sectional area. The network of large pores in the interior of the structure are integrated with the network of fine pores in the cover or shell layers of the structure. The more difficult to wet reactant is introduced directly into the interior of the porous structure and it tends to continuously fill the larger pores of the structure under a hydrostatic overpressure. The easier to wet reactant is introduced into the interior of the porous body through the fine pored outer layers. The easier to wet reactant is forced through the fine pores of the outer layers by hydrostatic pressure also. The easier to wet reactant thus tends to fill continuously the finer pores of the outer layer. The fine pores of the outer layers are so fine that the hydrostatic pressure of the harder to wet reactant cannot effectively overcome the capillary pressure of the easier to wet reactant in the fine pores. The two reactants are caused to flow in a countercurrent manner through the integrated porous network by the use of pressure differentials between the inlets and outlets for the respective reactants and reaction products. This countercurrent flow through the porous network provides a very large reaction interface within the porous network where the desired reaction may take place. The reaction interface boundary is dynamic in that it is influenced by the hydrostatic pressures exerted on the respective reactants. The porous network may be catalytically activated so as to either catalyze a reaction between reactants fed into the porous structure, or catalyze the decomposition of a raw material into a desired reactant which in turn will enter into a desired chemical or electrochemical reaction.

In conducting reactions in some fuel cells it is often necessary to employ a gas in the desired chemical or electrochemical reaction, either as one or more of the reactants or as a diluent for one or more of the reactants. In order to avoid the problems involved in using bottled gas for such purposes it is preferred to use, as the source of the gas, a gas precursor material which is more easier to handle and which has the gas bound therein, mechanically or chemically, and from which the gas may be readily produced as by contacting with a suitable catalyst an appropriate gas precursor which has the gas bound up therein chemically. For such purposes, those in the art have sought a device, and process, which would allow for a controlled release of the desired gases from their precursor materials under desirable pressures.

SUMMARY OF THE INVENTION

An object of the present invention, therefore, is to provide for the facile production of gases of the type which are used in fuel cells and which are commonly produced by the catalytic decomposition of selected fuel gas precursors.

A further object of the present invention is to provide for the facile supply of fuel gases in a continuous manner and under pressures that may be readily regulated.

The essence of the present invention involves the use of a gas generating device in which a porous gas generator element serves to separate a chamber which is a source of gas precursor raw material from a chamber in which reaction by-product or waste material is collected. The porous gas generator element has a catalytically active inner layer having a spectrum of large pores of varying sizes and outer or shell layers having fine pores of catalytically inactive material. Means are provided for creating a pressure differential between the two chambers, across the gas generator element. The pressure differential is used to control the flow of reactants and by-products, and the generation of the desired gas.

A further embodiment of the invention lies in the use of the gas produced, per se, or the pressure thereof, to control the flow of reactants or waste by-products.

Figure 2:
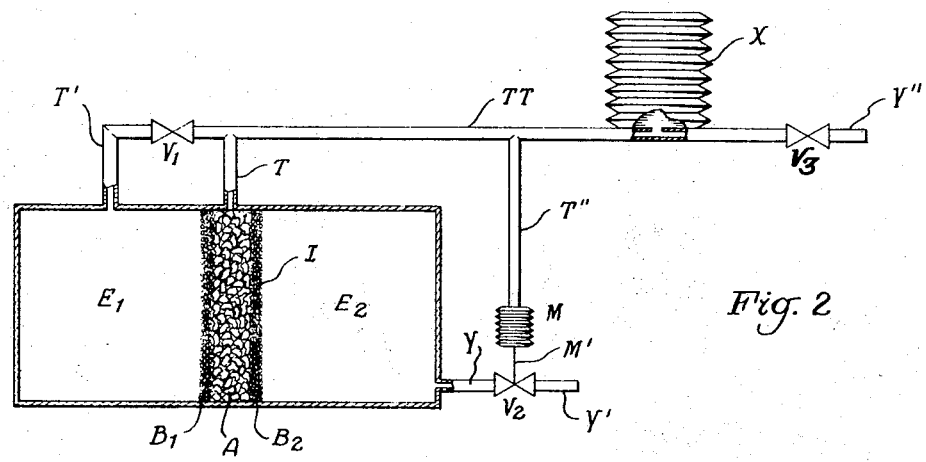
FIG. 2 is a schematic view of a more complex gas generating system according to the present invention in which some of the gas produced is circulated from the gas generator element to pressurize the flow of raw material to the gas generator element and the pressure of some of the gas produced is used to control the egress of waste material from the gas generator device.
Figure 3:
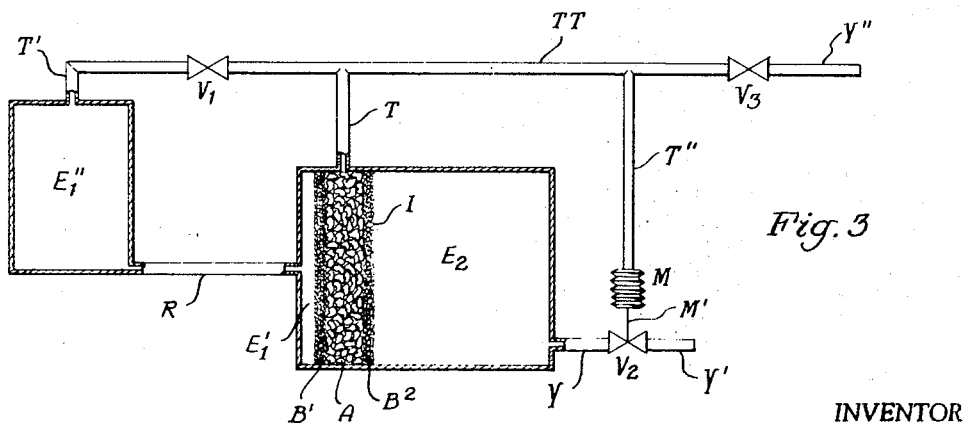
Figure 4:
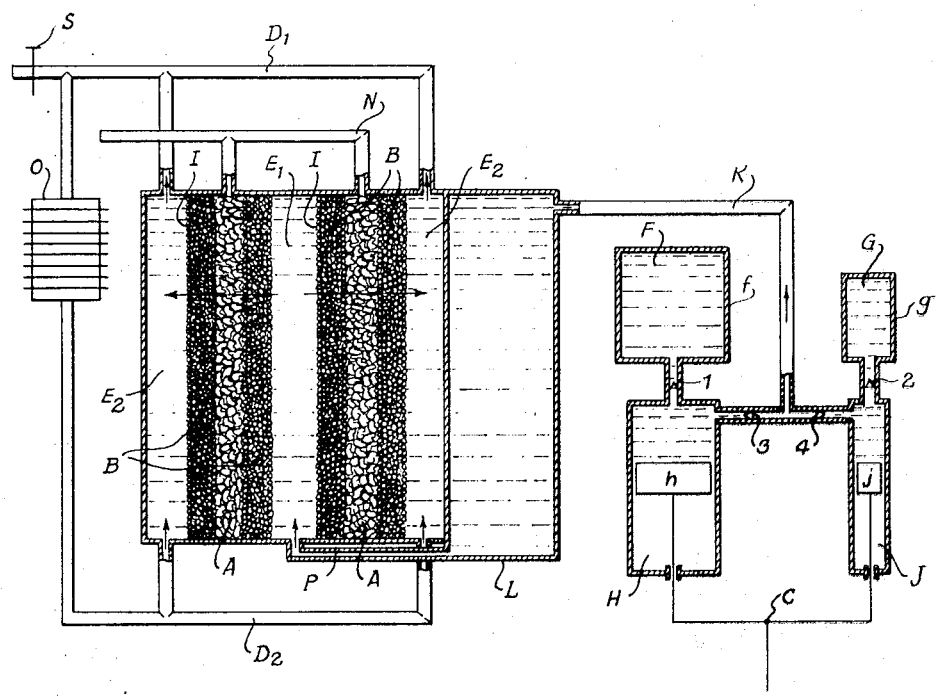

FIG. 3 is a modification of the gas generating system of FIG. 2 wherein the structure of the raw material supply chamber is modified so as to restrict the flow of raw material therefrom to the gas generator element. FIG. 4 is a schematic view of a further embodiment of a gas generating system according to the present invention wherein a heat exchange system is provided to allow for the removal of heat from the gas generating element during the exothermic reaction being conducted therein.

DETAILED DESCRIPTION OF THE INVENTION INCLUDING PREFERRED EMBODIMENT

In using the device and process of the present invention a liquid gas precursor is catalytically decomposed by contacting it with a catalyst embedded in a porous gas generating element. The liquid gas precursor is preferably one which will wet the porous structure of the gas generating element more readily than the gas produced therefrom. The manner of operation of the gas generating device and process of the present invention can be explained more readily with reference to the production of hydrogen by the catalytic decomposition of an aqueous solution of hydrazine.

Figure 1:
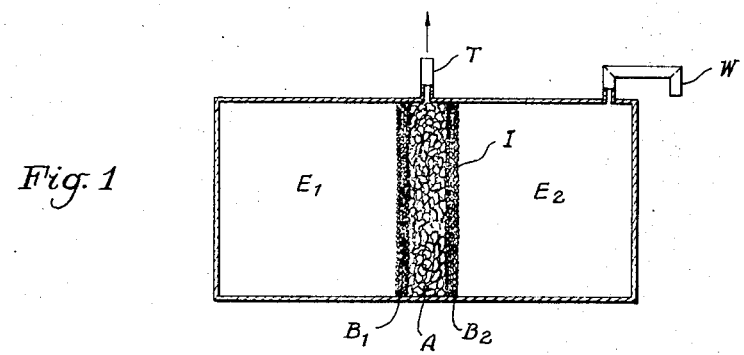
FIG. 1 is a schematic view of a relatively simple embodiment of a gas generator device in accordance with the present invention wherein a porous gas generating element separates a raw material supply chamber from a waste material chamber and an overflow pipe is used to help create the desired pressure differential between the two chambers.

Referring to the drawings, FIG. 1 shows a relatively simple embodiment of a gas generating device of the present invention. Gas generating element I of the gas generating device is composed of an inner, catalytically active porous layer A and outer catalytically inactive porous layers $B_1$ and $B_2$. Layer A has a coarse pored structure, having pores of the order of, on the average, e.g. 5 to 200 microns in cross sectional area. The coarse pored structure may be formed from a supporting framework of copper powder having Raney nickel granules embedded therein. The Raney nickel acts as a catalyst for the decomposition of hydrazine to hydrogen. Layers $B_1$ and $B_2$ are of a fine pored construction, having pores of the order of, on the average, 0.1 to 5 microns, e.g. in cross sectional area. The fine pored structure may be made from fine powdered copper. Gas generating element I acts as a separating wall between chambers $E_1$ and $E_2$. Chamber $E_1$ serves as a source of the hydrazine solution. When a pressure differential is created across porous gas generating element I between chambers $E_1$ and $E_2$, with the lower pressure in chamber $E_2$, the hydrazine solution is caused to flow into gas generating element I through layer $B_1$ towards chamber $E_2$. Chamber $E_2$ acts as a waste liquid collection chamber as described below. The hydrazine is thus caused to contact the Raney nickel catalyst embedded in the porous structure of layer A and to be decomposed into two volume parts of hydrogan gas and one volume part of nitrogen gas. The water present in the hydrazine solution is generally unaffected.

The waste water tends to flow through layer $B_2$ into waste collection chamber $E_2$ because it wets the pores of $B_2$ readily and is being forced in the direction of chamber $E_2$ by the pressure differential between chambers $E_1$ and $E_2$. As the gas forms in layer A it builds up pressure therein which tends to at least partially displace whatever liquids are present, i.e., water and unreacted hydrazine, from the larger sized pores. Nevertheless, because so many of the pores in layer A remain filled with hydrazine solution and waste water, the gas cannot enter all of such pores. As a result, the gases are forced to escape from layer A by rising through the larger size pores therein and escape through tube T provided for this purpose, and a fresh supply of hydrazine solution is thus allowed to flow at a constant rate into layer A and the production of hydrogen therein proceeds continuously at a rate which is dependent upon the velocity of flow of hydrazine solution. W is an overflow line which permits the escape of waste liquid by product from chamber $E_2$. The pressure differential between chambers $E_1$ and $E_2$ is regulated by the flow of liquid through line W which flow can be regulated by applying positive or negative pressure to the flow in line W.

In order to stop the process it is thus only necessary to apply positive pressure to the flow in line W in order to equalize the pressure differential between chambers $E_1$ and $E_2$ and thus stop the flow of hydrazine solution from chamber $E_1$.

In carrying out the process of the present invention it is preferred to use alkaline solutions of hydrazine. The use of copper in the construction of fine pored layers $B_1$ and $B_2$ is also preferred since copper has a high overvoltage relative to hydrogen and the use of copper in layers $B_1$ and $B_2$ prevents the formation of hydrogen in such layers and loss of it by gas bubble separation from the generator element. Because of the negative decomposition potential of the hydrazine, the decomposition of the hydrazine only takes place in the catalytically active layer A, so that the entire quantity of hydrogen produced is rendered available for use directly from such layer. The gas generator device of the present invention is particularly suited for use as a hydrogen gas generator for use in supplying hydrogen to hydrogen electrodes in fuel cells. The gas pressures used in such devices do not tolerate the loss of fuel gas by gas bubbling from the cover layers of the gas generating devices.

Instead of hydrazine, other hydrogen gas precursors can be used as the source of hydrogen, such as aqueous solutions of alkali metal borohydrides or similar compounds. The gas generating device of the present invention can also be used in the form of a device which is capable of automatically regulating its own operations. The device shown in FIG. 2 is an example of such a self regulating device. In FIG. 2, the elements represented by reference characters I, A, $B_1$, $B_2$, E, $E_2$, and T are the same as the corresponding elements shown in FIG. 1. The gas formed in layer A can be utilized in several different ways, separately or concurrently. X is a reservoir for the storage of gas for future use by a consumer outside the gas generating device, such as in a hydrogen diffusion electrode. The gas to be used outside the gas generating device is removed from the device through gas lines T, TT and Y" by the opening of valve $V_3$. Some of all of the gas being produced may also be circulated through lines T and T' from layer A to chamber $E_1$, upon opening valve V, and closing valve $V_3$, so as to pressurize the supply of hydrazine or other raw material in chamber $E_2$. This pressurizing of chamber $E_1$ will contribute to the creation of a pressure differential between chambers $E_1$ and $E_2$ so as to cause the flow of raw material from chamber $E_1$ through layers $B_1$, A and $B_2$ towards chamber $E_2$.

As long as discharge valve $V_2$ remains closed the raw material free waste liquid will fill chamber $E_2$ under the force of the combined circulated gas pressure and hydrostatic pressure in chamber $E_1$. The waste liquid in chamber $E_2$ can be removed through discharge lines Y and Y' by opening valve $V_2$. Upon the opening of valve $V_2$ and the removal of liquid from chamber $E_2$ a pressure differential also arises between chambers $E_1$ and $E_2$ to further facilitate the flow of raw material from chamber $E_1$ through layers $B_1$, A and $B_2$. Valve $V_2$ is a pneumatic valve which can be pneumatically controlled, with the aid of a gas pressure sensitive device M and control line M', by the pressure of the gas in gasline P". Valve $V_2$ can thus be made to open when the gas pressure in gasline system T", TT, T, etc., exceeds a previously determined minimum value indicative of a need for causing flow of raw material from chamber $E_2$ in order to provide for a continued production of gas in the gas generator element.

As indicated above with reference to FIG. 2, the rate of production of gas in gas element I can be regulated in several ways. A low rate of gas production may be desired during periods in which the consumption of the gas by the consumer is at a rate which requires only a relatively low output from the gas generator. Other means of accomplishing this end may be employed using other embodiments of the present invention. The flow of raw material, or hydrazine in the case of hydrogen production, to the gas generating element can be lengthened, or otherwise curtailed, as by limiting the amount of such raw material that comes in contact with the gas generating layer. One way of accomplishing this would be to use a relatively thick layer $B_1$ so as to curtail the flow of raw material therethrough. Another way of limiting the amount of raw material coming in contact with the gas generating element is shown in FIG. 3. In the gas generating device shown in FIG. 3 according to the present invention the raw material supply chamber corresponding to chamber $E_1$ in FIG. 2 has been constructed with a relatively long pipe R of relatively narrow cross-sectional area connecting sub-chamber $E_1'$ with sub-chamber $E_1''$. Sub-chamber $E_1''$ is of substantially larger volume than sub-chamber $E_1'$ and sub-chamber $E_1''$ serves as the main supply chamber for the raw material to be used in gas generating element I. Sub-chamber $E_1'$ is of relatively narrow width and it faces the entire length of inner layer $B_1$. All the other elements of FIG. 3 are the same as those having the same reference characters in FIG. 2. The operation of the gas generating device shown in FIG. 3 is essentially the same as that described above for the device shown in FIG. 2. The gas circulated from layer A through lines T and T', however, exerts its pressure directly on the contents of sub-chamber $E_1''$ and such pressure is exerted on the contents of sub-chamber $E_1'$ by being transmitted through the contents of pipe R. The construction of sub-chambers $E_1''$ and $E_1'$, joined by pipe R, therefore, allows for only a limited supply of raw material to reach gas generating element I.

The gas generating devices shown in FIGS. 1, 2 and 3 are not the only possible embodiments of the apparatus of the present invention. The application of pressure to chamber $E_1$ to cause the flow of raw material therefrom need not, for example, be accomplished by the circulation thereto of gas formed in layer A. Such pressure can be readily supplied from a pressurizing device external of the gas generating system of the present invention so that none of the gas produced in the gas generating device need be used for this purpose. The main point to be noted is that by regulating the pressure in the raw material supply chamber it is possible to directly control the velocity of flow of raw material from such chamber to the gas generating element and thus the production of gas in such element. The pressure exerted on the raw material in the raw material supply chamber must be sufficient, in order to cause a flow of raw material from such chamber, to overcome the pressure in the waste material chamber $E_2$, which may be below atmospheric pressure if overflow pipe W in FIG. 1, for example, is operated under a negative pressure; or which may be at atmospheric pressure if valve $V_2$ in FIGS. 2 and 3, for example, are opened and the contents of chamber $E_2$ are drained into an outside storage container which lies under atmospheric pressure; or which may be at super-atmospheric pressure if valve $V_2$ in FIGS. 2 and 3, for example, are kept closed during the operation of the system and the pressure in chamber $E_2$ builds up as the chamber fills with waste liquid. In any event it is important that the velocity of flow of raw material to the gas generating element be such as to provide enough raw material in order to, in turn, provide enough gas to meet the current consumption of gas by the consumer. Where the gas is being consumed in, for example, a detonating gas type battery which may be used to power the operation of one type of machine or another, the output of the battery could also be used, in combination with appropriate current monitoring equipment, to control the feed of raw material to the gas generating element I in FIG. 2, as by using the output of the battery to also regulate the opening and closing of valve $V_1$ during the operation of the gas generating device.

When hydrazine is used as the raw material source of hydrogen, nitrogen gas, and possibly small amounts of ammonia are also produced. In some types of fuel cells these other gases must be separated from the hydrogen before the hydrogen can be used as a fuel gas. This tends to detract from the ability of the gas producer to directly correlate the production of the hydrogen with the amount being currently consumed. If, however, alkali metal borohydrides, such as potassium borohydride, are used as the raw material source of hydrogen, pure hydrogen gas is the only gaseous product resulting from the catalytic decomposition of such materials and the velocity of flow of raw material can be more readily and directly correlated to the consumption of hydrogen by the consumer as described above.

If either the raw material supply chamber or the waste material collection chamber of the device shown in FIG. 1 is under atmospheric pressure then the device, when operating, can only deliver gas, as produced, at a pressure which, at most, is equal to the combined capillary pressure of the raw material solution in layer $B_1$ and waste liquid in layer $B_2$. The device shown in FIGS. 2 and 3, however, provides raw material supply chambers and waste liquid chambers which are constructed as part of a closed system as to allow them to be internally pressurized regardless of the pressure outside such chambers. As a result gas produced in such devices can be produced and recovered at any desired pressure above atmospheric pressure by the circulation of gas from layer A to the raw material supply chamber and by using the pressure of the gas in line T" to regulate the flow of waste liquid through valve $V_2$. Gas from layer A, incidentially, could also be piped directly into the waste liquid collection chamber to pressurize the contents of such chamber. It should be noted, however, that in producing gas in the devices shown in FIGS. 2 and 3 under such excess pressure conditions, the pressure differential between the gas pressure in chamber $E_1$ and the hydrostatic pressure in chamber $E_2$ should never be greater than the capillary pressure of the liquids in fine pored layers $B_1$ and $B_2$.

Of course, the use of Raney nickel as the catalyst for the decomposition of the gas precursor raw material, or of copper to form the fine pored layers, only represents one or two of the various embodiments of the construction of the gas generating device of the present invention. Thus, catalytically active porous bodies in which platinum or palladium are used as the gas precursor decomposition catalyst may also be employed in the gas generating device of the present invention. Fine-pored, non-conductive diaphragms made of asbestos may be used as the outer layers of the gas generating element. The gas generating device of the present invention may also be used in the generation of oxygen from aqueous solutions of hydrogen peroxide.

In such operations the catalyst used to decompose the hydrogen peroxide could be silver embedded in a coarse poured framework of carbonyl nickel and fine porous cover layers made of carbonyl nickel could be used adjacent the raw material supply chamber and waste material collection chamber.

As an alternative mode of construction for a gas operating element to be used in the production of oxygen, the cover layers for the gas generating element can also be made of fine pored asbestos diaphragms which are formed on both sides of the coarse pored inner layer by being pressed thereon with the aid of porous pressure discs.

Since the gas precursor decomposition reaction is an exothermic reaction, considerable quantities of heat are generated which must be removed from the gas generating element as it is formed during the decomposition reaction which takes place at a high rate of decomposition. This can be accomplished in several ways. In one mode of operation the gas generating element is provided with heat exchange surfaces or fins made of copper sheets which extend away from the gas generating element. It is also possible to remove the heat from the exothermic reaction with the aid of a circulatory system of cooling liquid.

FIG. 4 depicts, schematically, a gas generating system according to the present invention in which a circulating system of cooling liquid is used to remove heat from the gas generating element. Container $g$ stores a liquid, gas precursor raw material G. Container $f$ stores a liquid diluent F for the raw material G. Control rod C activates pistons $h$ and $j$ in chambers H and J, respectively. As the pistons are drawn towards the bottom of chambers H and J the weight of the liquids in chambers $f$ and $g$ will cause needle valves 1 and 2 to open and permit the liquids to drain into chambers H and J, respectively. During the filling of chambers H and J the weight of the liquid in line K will cause needle valves 3 and 4 to close access to line K from chambers H and J. When a sufficient charge of liquids are present in chambers H and J, rod C is then raised to force pistons $h$ and $j$ upwards. As pistons $h$ and $j$ rise, the resulting pressure on the liquids in the upper portions of chambers H and J will force needle valves 1 and 2 to seal containers $f$ and $g$, respectively, and thus prevent further drainage from such chambers, and such pressure will also push in needle valves 3 and 4 and allow the liquid charges in the upper portions of chambers H and J to mix and egress together through pipeline K into raw material storage container L. With proper adjustment of the volume of chambers H and J, or of pistons $h$ and $j$, or of the length of each of the length of each of the arms of rod C, it would be possible to provide for the mixing of liquids F and G in any proportions necessary. From storage container L the mixture of liquids F and G is fed through pipeline P into chamber E and through the coarse pored, catalytically active layers A of one or more gas generating elements I into chambers $E_2$. The gas precursor raw material component of the liquid mixture is thus brought in contact with the catalyst needed to decompose the raw material into the desired gas. As the gas is formed it rises to the top of layer A and leaves the gas generating system through gas line N. Liquid waste product and the liquid diluent leave layer A through catalytically inactive fine pored outer layers B of the gas generator elements I and enter waste liquid collection chambers $E_2$. Such liquids also serve to remove from the gas generating elements I the exothermic heat of the decomposition reaction being conducted in layers A. The waste liquid may be circulated from chambers $E_2$ through waste line $D_1$ to cooler O to remove heat from such liquid before recirculating it to chambers $E_2$ through waste line $D_2$. Excess waste liquid can be removed from the system through valve S. A pressure differential between the raw material storage container L and waste material collection chambers $E_2$ may be provided by applying excess pressure through pipeline K and/or by exerting a negative pressure on line $D_1$ through valve S. The gas in gas line N may also be used to pressurize the contents of storage container L.

Figure 5:
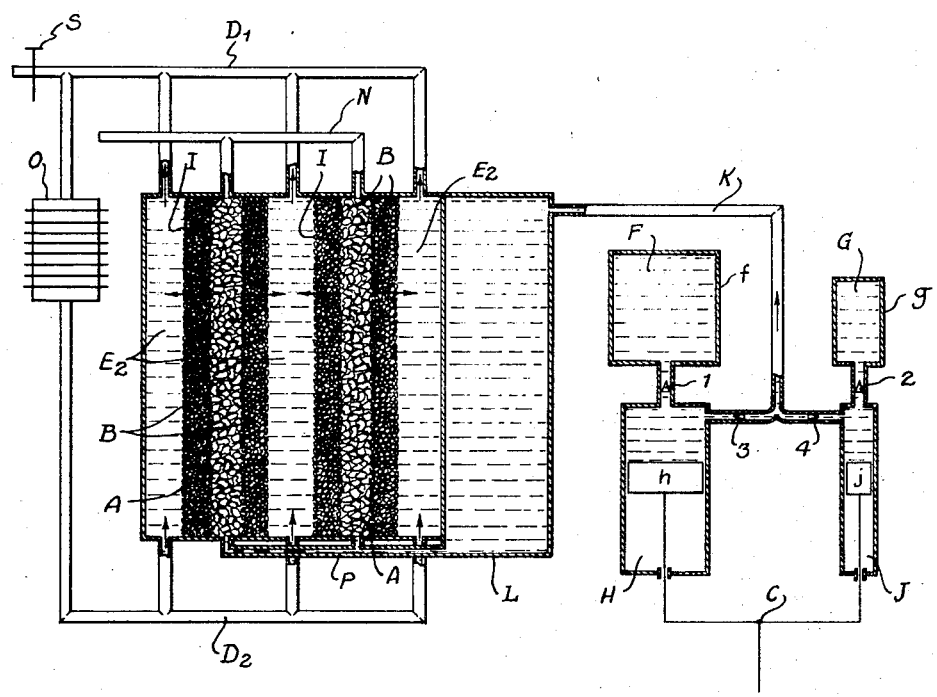

FIG. 5 depicts, schematically, a gas generating system according to the present invention in which a circulating system of cooling liquid is used to remove heat from the gas generating element. Container $g$ stores a liquid, gas precursor raw material G. Container $f$ stores a liquid diluent F for the raw material G. Control rod C activates pistons $h$ and $j$ in chambers H and J, respectively. As the pistons are drawn towards the bottom of chambers H and J the weight of the liquids in chambers $f$ and $g$ will cause needle valves 1 and 2 to open and permit the liquids to drain into chambers H and J, respectively. During the filling of chambers H and J the weight of the liquid in line K will cause needle valves 3 and 4 to close access to line K from chambers H and J. When a sufficient charge of liquids are present in chambers H and J, rod C is then raised to force pistons $h$ and $j$ upwards. As pistons $h$ and $j$ rise, the resulting pressure on the liquids in the upper portions of chambers H and J will force needle valves 1 and 2 to seal containers $f$ and $g$, respectively, and thus prevent further drainage from such chambers, and such pressure will also push in needle valves 3 and 4 and allow the liquid charges in the upper portions of chambers H and J to mix and egress together through pipeline K into raw material storage container L. With proper adjustment of the volume of chambers H and J, or of pistons $h$ and $j$, or of the length of each of the arms of rod C, it would be possible to provide for the mixing of liquids F and G in any proportions necessary. From storage container L the mixture of liquids F and G is fed through pipeline P into coarse pored, catalytically active layers A of one or more gas generating elements I. The gas precursor raw material component of the liquid mixture is thus brought in contact with the catalyst needed to decompose the raw material into the desired gas. As the gas is formed it rises to the top of layer A and leaves the gas generating system through gas line N. Liquid waste product and the liquid diluent leave layer A through catalytically inactive fine pored outer layers B of the gas generator elements I and enter waste liquid collection chambers $E_2$. Such liquids also serve to remove from the gas generating elements I the exothermic heat of the decomposition reaction being conducted in layers A. The waste liquid may be circulated from chambers $E_2$ through waste line $D_1$ to cooler O to remove heat from such liquid before recirculating it to chambers $E_2$ through waste line $D_2$. Excess waste liquid can be removed from the system through valve S. A pressure differential between the raw material storage container L and waste material collection chambers $E_2$ may be provided by applying excess pressure through pipeline K and/or by exerting a negative pressure on line $D_1$ through valve S. The gas in gas lines N may also be used to pressurize the contents of storage container L.

The following example is merely illustrative of the device and process of the present invention and is not intended as a limitation upon the scope thereof.

EXAMPLE

A gas generating element as described above with reference to FIG. 1 was prepared. It was 40 mm. in diameter having an inner coarse pored layer which was 30 mm. thick and made from copper powder with granules of Raney-nickel embedded therein, and it had two catalytically inert cover layers 0.5 mm. thick which were fine pored and made from copper powder. The gas generating element was placed in a gas generator made of epoxy resin and put between a raw material supply chamber having a volume of about 10 l. and a waste liquid chamber having a volume of about 100 cm.$^3$. A nickel pipe was inserted in the gas generating layer for the removal of gas generated therein. During the experiment the pressure of the gas in the gas generating layer was held constant at 1 atmosphere. When a pressure differential of 0.2 atmosphere was applied between the raw material supply chamber and the waste liquid chambers, 60 cc. of raw material solution per hour flowed into layer A. This raw material solution consisted of an alkaline, aqueous solution of hydrazine and contained 10 mol of hydrazine per liter. Therefore, 0.6 mol of hydrazine per hour were catalytically decomposed in layer A to produce 1.2 mol or 27 liters per hour of hydrogen and 1.2 mol or 13.5 liters per hour of nitrogen (at atmospheric pressure). With this quantity of hydrogen thus produced, it was possible to produce an electric current of 65 amperes in an oxygen/hydrogen fuel cell utilizing gas diffusion electrodes. The heat generated in gas generating layer A during the decomposition of the hydrazine solution amount to 9.6 kcal./hour and it was removed from the gas generating element with the aid of copper fins projecting from the gas generating element and through the epoxy resin shell of the gas generator. The pressure values given in this example are gauge pressures.

I claim:

1. A gas generating device in which gas is liberated by a liquid raw material from which the gas may be generated by contacting a suitable catalyst and a waste material is produced as a by-product, the device comprising a raw material supply chamber means and a waste material chamber separated by a gas generating chamber having a catalyst-charged coarse pored inner layer, and catalytically inactive fine pored surfaces facing said raw material and said waste material chambers, gas line means connected to said coarse pored gas generating layer to allow for the flow of gas generated from said coarse pored layer, said raw material supply chamber means comprising two separate sub-chambers, a first sub-chamber facing said gas generating chamber along the length thereof and being narrow in depth and a second sub-chamber of substantially greater volume than said first sub-chamber and connected to said first sub-chamber by an elongated conduit having a narrow cross-sectional area, and pressure differential means to create a pressure differential between said raw material supply chamber and said waste material chamber, said pressure differential means including an operative connection between said gas line means and said second sub-chamber.

2. A gas generating device in which gas is formed by contacting, with a suitable catalyst, a liquid raw material from which said gas may be produced with waste material by-product as a result of said contacting, and the flow of resulting gas is controlled, comprising a raw material supply chamber and a waste material chamber separated by a gas generating chamber,
    said gas generating chamber having a catalyst charged, coarse pored inner layer and catalytically inactive fine pored surfaces facing said raw material supply chamber and said waste material chamber, and
    said raw material supply chamber comprising two separate sub-chambers connected by an elongated circuit,
        the first of said sub-chambers facing said gas generating chamber along the length thereof and being narrow in depth, the second of said sub-chambers being of substantially greater volume than the first of said sub-chambers, and
        said conduit being adapted to deliver relatively small amounts of raw material to said first sub-chamber from said second sub-chamber,
first gas line means having first valve means therein and connecting said catalyst charged, coarse pored inner layer to the second of said sub-chambers,
    second gas line means branching from said first gas line means at a point below said first valve means so as to provide egress from said device of gas formed in said inner layer,
        whereby upon the opening of said first valve means a portion of the gas formed in said inner layer is caused to flow to said raw material supply chamber through said first gas line means and the remainder of the gas so formed is caused to egress from said device through said second gas line means, and upon the closing of said first valve means all the gas formed in said inner layer is caused to egress from said device through said second gas line means, and
waste material disposal line means having pneumatic valve means therein and connected to said waste material chamber and adapted to provide for a pressure differential between said supply chamber and said waste material chamber and for the removal of waste material through said waste material disposal line upon the opening of said pneumatic valve means during the operation of said device, by thereby causing a gas pressurized flow of raw material from said raw material supply chamber under the force of pressure of gas generated in said inner layer,
    said pneumatic valve means being connected to said second gas line means in such a way as to allow the pressure of the gas in said second gas line means to be used to regulate the operation of said pneumatic valve means and thereby control the use of said pressure differential and the flow of waste material from said waste material chamber.

References Cited

UNITED STATES PATENTS

| | | | |
|---|---|---|---|
| 3,121,031 | 2/1964 | Gruneberg et al. | 136—86 |
| 3,174,833 | 3/1965 | Blackmer | 23—282 |

FOREIGN PATENTS

| | | |
|---|---|---|
| 848,586 | 9/1960 | Great Britain. |

JAMES H. TAYMAN, JR., Primary Examiner

U.S. Cl. X.R.

23—1, 282; 136—86; 252—477